(12) United States Patent
Smith et al.

(10) Patent No.: US 6,805,462 B1
(45) Date of Patent: Oct. 19, 2004

(54) TOWABLE LIGHT TOWER AND POWER PLANT

(75) Inventors: Lloyd Smith, Berlin, VT (US); Robert C. Dezan, Claremont, NH (US); Philip H. Dupuis, Keene, NH (US)

(73) Assignee: Sullivan-Palatek, Inc., Claremont, NH (US)

( * ) Notice: Subject to any disclaimer, the term of this patent is extended or adjusted under 35 U.S.C. 154(b) by 0 days.

(21) Appl. No.: 10/234,011

(22) Filed: Sep. 3, 2002

(51) Int. Cl.[7] .................................................. B60Q 1/00
(52) U.S. Cl. .................... 362/192; 362/431; 52/118; 52/121
(58) Field of Search ................................ 362/192, 431, 362/376, 103, 74; 52/121, 118

(56) References Cited

U.S. PATENT DOCUMENTS

| | | | | |
|---|---|---|---|---|
| 4,001,573 A | * | 1/1977 | Derasp | 362/403 |
| 4,298,913 A | * | 11/1981 | Lozar | 362/103 |
| 5,362,207 A | | 11/1994 | Martin et al. | 417/243 |
| 5,418,701 A | * | 5/1995 | Hart | 362/376 |
| 5,550,333 A | | 8/1996 | Whiteman, Jr. | 181/204 |
| 5,691,692 A | | 11/1997 | Herbstritt | 340/438 |
| 5,806,963 A | * | 9/1998 | Miller et al. | 362/192 |

OTHER PUBLICATIONS

U.S. patent application Ser. No. 09/905,856, Parkert et al., filed Jul. 13, 1991.

* cited by examiner

*Primary Examiner*—Stephen Husar
*Assistant Examiner*—James Cranson
(74) *Attorney, Agent, or Firm*—Hayes Soloway PC.

(57) ABSTRACT

A towable power plant is disclosed capable of supplying visible light for use at a worksite and at least on other power source. The power source may generate compressed air, electricity, or may pump water or a hydraulic fluid. The light tower may be coupled to the drawbar of an existing towable power plant.

22 Claims, 4 Drawing Sheets

TOWABLE LIGHT TOWER AND POWER PLANT

FIELD OF THE INVENTION

The present invention relates to the field of towable power plant and more particularly to a power plant capable of generating compressed air and worksite illumination.

BACKGROUND OF THE INVENTION

Trailerable power plants are used as power sources at remote locations. Gas or diesel engines are usually mounted upon a trailer frame, together with their accessory units such as cooling or radiator systems, fuel tanks, and associated electrical systems, and are used to drive a single power source, such as, for example, an electrical generator, hydraulic pump, air compressor, or water pump. They are most commonly used in civil construction applications such as road or building construction projects where regular utility services may not be readily available. Examples of such applications include trailerable light towers used for illumination of road construction projects where connection to electrical power lines would be difficult or impossible to achieve. Another example would be an air compressor air for a pneumatic jack hammer.

Many road construction projects are typically done a night to limit the impact on commuters traveling to and from work. Nighttime road work projects such as repairing or replacing pipes under a roadway require the contractor to tow an air compressor and a light tower to the worksite. The air compressor is used as a source of compressed air for a pneumatic jackhammer and the light tower is used to illuminate the worksite. A problem with separate towable units for compressed air and lights occurs on smaller jobs where a single person could perform the task, but the contractor is required to send two workers, one to drive each of the tow vehicles.

Towable light towers are typically used to light a large worksite and the lights run directly off of the engine. A drawback to this type of system is that a user must start the engine in order to get light to illuminate a worksite.

Accordingly what is needed is a single towable engine housing that is capable of generating compressed air and work sight illumination. It is also desirable to have a light tower kit that may be added to an existing towable power unit.

SUMMARY OF THE INVENTION

In accordance with one aspect of the present invention, a towable air compressor and light tower unit is disclosed that is mounted to a trailer with wheels and a hitch. A user may tow this single unit to a job site and provide illumination of the work site and compressed air for powering a jackhammer or other tool.

In accordance with another aspect of the present invention, a light tower kit is disclosed that can be secured to an existing towable air compressor, electric generator, hydraulic pump, or water pump power plant to add the feature of worksite illumination.

The above and other objects, feature, and advantages of the present invention will be apparent in the following detailed description thereof when read in conjunction with the appended drawings wherein the same reference numerals denote the same or similar parts throughout the several views.

DETAILED DESCRIPTION OF THE INVENTION

Figure 1:
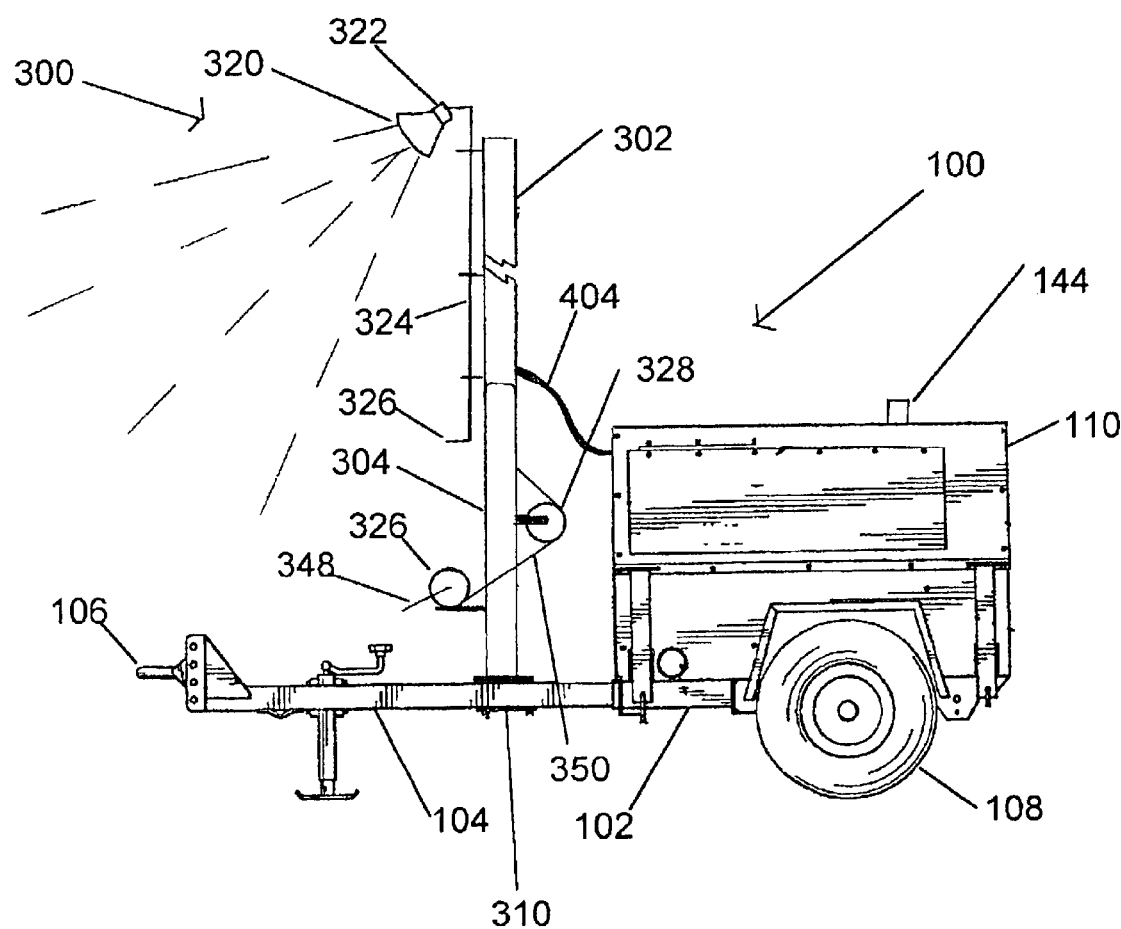
FIG. 1 is a side view of a towable power plant consistent with the present invention.

The general arrangement of the elements is shown most clearly in FIG. 1. This shows a towable power plant 100 including a frame 102 with a drawbar 104 and a hitch 106. A pair of wheels 108 is coupled to the frame 102 either with or without suspension. An enclosure 110 houses an engine 202. The engine 202 may be fixedly secured to the frame 102. A light tower 300 may be coupled to the drawbar 104. The light tower 300 may be coupled to the drawbar 104 with mechanical fasteners, by welding or any other process. A portion of the light tower 300 is moveable between a towable position and a working position. In the towable position, the moveable portion of the light tower may be secured to a coupling 144 secured to the enclosure 110. In the working position the light tower is preferably coupled only to the frame 102 and does not contact the housing 110.

Figure 2:
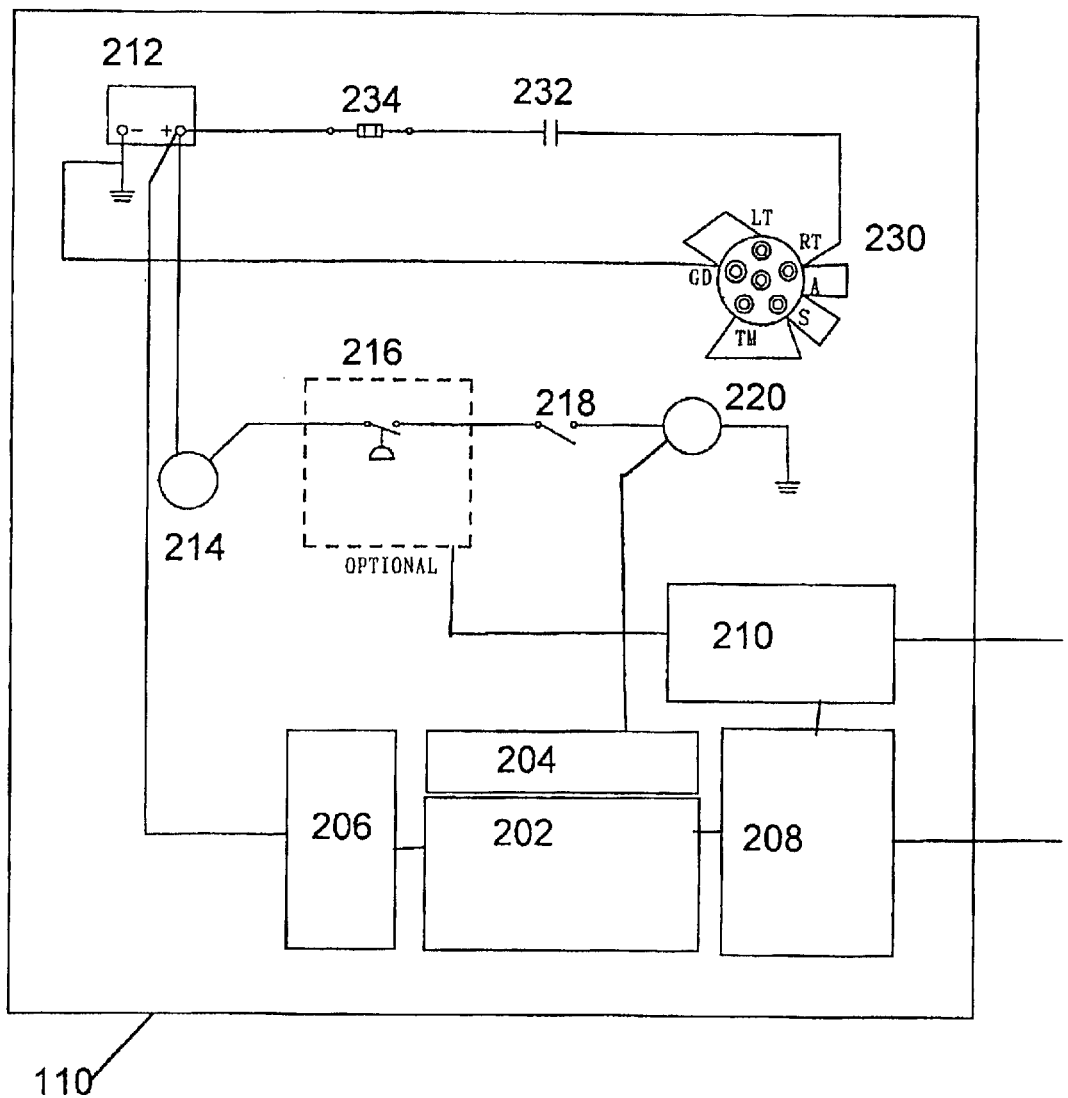
FIG. 2 is a block diagram of a towable power plant consistent with the present invention.

As shown in FIG. 2, the engine 202 is coupled to a starter 204, an alternator 206, and an air compressor 208. Alternatively, the engine 202 may drive an electric generator, a water pump, or a hydraulic pump. The engine 202 may use any fuel including, but not limited to, gasoline, diesel, and natural gas. The compressor 208 may be coupled to a storage tank 210 in known fashion. The output of the compressor 208 or the tank 210 may be used to drive pneumatic tools such as a jackhammer. The alternator 206 may be used to recharge an energy storage device, for example a battery 212. The battery 212 may be coupled to the starter 204 through a series of switches or actuators and a relay coil 220 that may be arranged in a variety of different ways. An ignition switch 214 may be manually operable with a key or any other means to make or break electrical connection with the battery 212. The ignition switch is preferably a momentary switch. An optional air pressure switch 216 may also be used to make or break electrical connection with the battery 212. The air switch may break connection with the battery if the air pressure in the tank 210 exceeds a predetermined value. A manually operable switch, for example a toggle switch 218 may also be used to make or break electrical connection with the battery 212. The toggle switch is preferably a maintained switch.

A socket 230 may also be electrically coupled to the battery 212 through a fuse 234 and a relay contact 232. The relay contact may be used to control the on/off status of the lamp 320 and may have an actuator that extends through an opening in the enclosure 110. The socket may be mechanically coupled to the housing 110 of the towable power plant 100.

Figure 3:
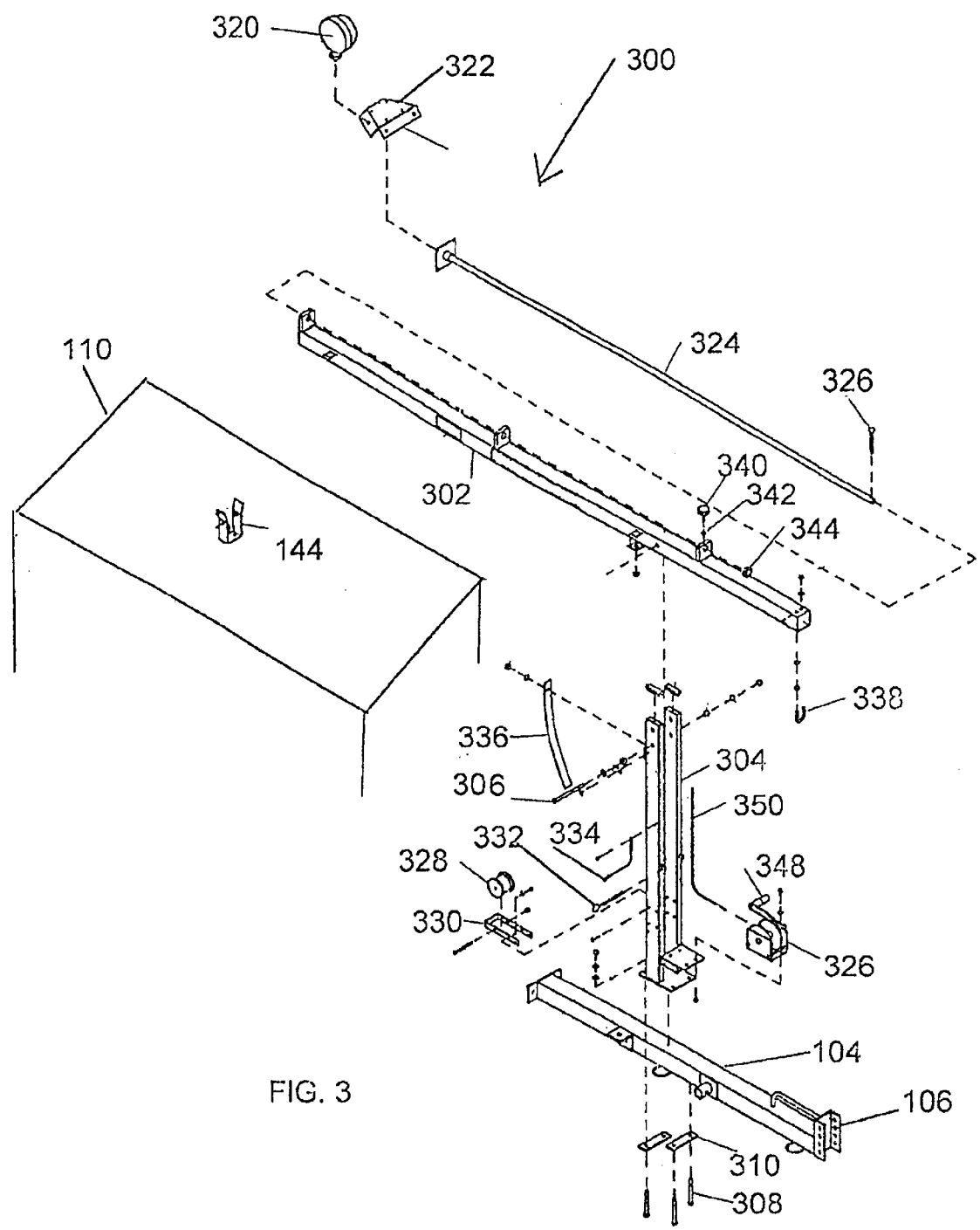
FIG. 3 is an exploded view of a light tower consistent with the present invention.

FIG. 3 shows the light tower assembly 300. The light tower assembly includes a first support member 302 rotatably coupled to a second support member 304 about a pivot pin 306. The first member 302 is moveable between a towable position (as shown in FIG. 3) and a working position (as shown in FIG. 1). The second member 304 is coupleable to a draw bar 104 of a towable trailer with mechanical fasteners 308 and clamps 310. Alternative fastening methods including welding shall be considered part of the present invention. The first member 302 may be mechanically secured to the second member 304 in the working position with a pin 332.

A lamp 320, for example a 100-watt incandescent lamp, may be coupled to a light-mounting bracket 322 that is couple to a light-rotating shaft 324. Preferably, a plurality of lamp may be coupled to the light-mounting bracket 322. The light-rotating shaft 324 is capable of being manually rotated about the longitudinal axis of the first member 302 with a handle 326. The light-rotating shaft 324 may extend through a series of aligned opening in plates extending from the first member 302. Knob 340 may be used to resist rotational motion of the shaft 324. A retainer 342 and collar 344 may be used to prevent removal of the shaft 324 along the longitudinal axis of support member 302.

A winch 326 with a handle 348 is coupled to the second member 304 with suitable fasteners or by welding. A first end of a cable 350 may be connected to the winch 326 and then extends around a guide or pulley 328 and the second end is coupled to the first member 302 near an end opposite the lamp 320. The pulley 328 may be secured to the second member 304 with a bracket 330. A lanyard 334 may be used to secure locking pin 30 and a leaf spring 336 may be used to aid in lowering upper support 302 from vertical position. A wire clip 338 may be used to secure cable assembly to upper support 302.

Figure 4:
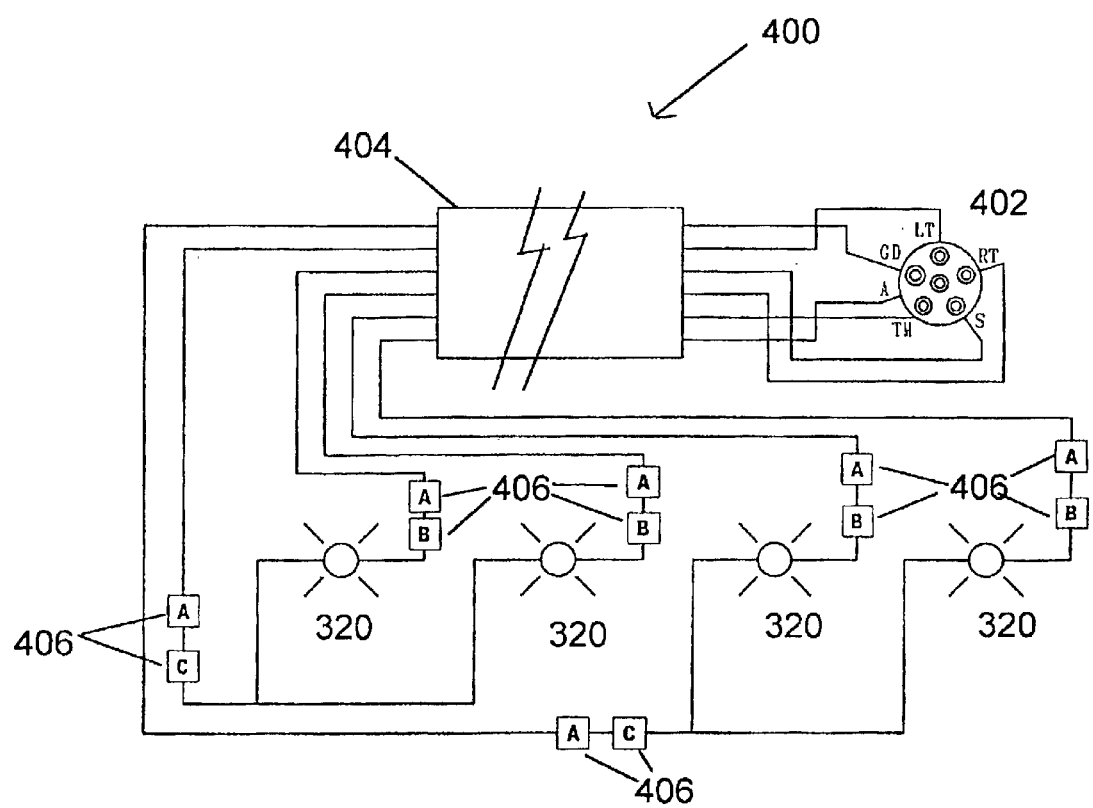
FIG. 4 is an electrical block diagram of a light tower coupleable to the power plant of FIG. 2.

FIG. 4 shows a wiring assembly 400 with a plug 402 coupled at a first end of a length of cable 404 and at least one lamp electrically coupled to a second end. Connectors 406 may be used to allow for removal of the lamp. The connector 406 may be coupled to lamp 320. A portion of the wiring assembly 400 may be secured to the outside of the first member 302 or alternatively it has to be housed inside of the first member. The plug 402 is matable with the socket 230.

Alternatively a wiring assembly 400 may have alligator style clips secured at the first end in place of the plug 402 to allow for connection to the positive terminal of battery 212 and the negative terminal of the battery or a convenient grounding point. The cable 404 may enter the enclosure through an existing opening or through one of the enclosure doors.

It should be understood that, while the present invention has been described in detail herein, the invention can be embodied otherwise without departing from the principles thereof, and such other embodiments are meant to come within the scope of the present invention as defined in the following claims:

We claim:

1. A towable power plant, comprising:
a frame having a drawbar with a hitch;
at least one wheel coupled to the frame;
an engine secured to the frame;
a compressor coupled to the engine for generating compressed air;
an energy storage device for starting the engine;
at least one lamp electrically coupled to the energy storage device;
a first support member mechanically coupled to the lamp; and
a second support member coupled to the drawbar, the first support member pivotably coupled to the second member and moveable between a towable position and a working position.

2. The towable power plant of claim 1 wherein in the towable position the second support member is generally horizontal and in the working position the second member is generally vertical.

3. The towable power plant of claim 1 further comprising a winch to facilitate movement of the first member from the towable position to the working position.

4. The towable power plant of claim 3 wherein the winch is coupled to the second member.

5. The towable power plant of claim 1 wherein a rotatable shaft couples the lamp to the first member.

6. The towable power plant of claim 1 further comprising an actuator to control the on/of status of the lamp independently of the engine.

7. The towable power plant of claim 1 further comprising a device coupled to the engine for recharging the energy storage device.

8. The towable power plant of claim 1 wherein the engine, the energy storage device and the compressor are enclosed in an enclosure secured to the frame.

9. The towable power plant of claim 8 further comprising a cable coupled at a first end to the lamp and a connector at a second end, the connector coupleable to a mating connector secured to the enclosure.

10. A light tower kit for coupling to a towable power source, comprising:
a frame having a drawbar;
an engine secured to the frame;
a compressor coupled to the engine for generating compressed air;
at least one lamp;
a first support member coupled to the lamp;
a second support member coupleable to the drawbar of the frame, the first member pivotably coupled to the second member and moveable between a towable position and a working position;
a winch secured to the second member to facilitate movement of the first member from the towable position to the working position.

11. The light tower kit of claim 10 further comprising a pin to lock the first member relative to the second member.

12. The light tower kit of claim 10 wherein in the towable position the second support member is generally horizontal and in the working position the second member is generally vertical.

13. The light tower kit of claim 10 wherein a rotatable shaft couples the lamp to the first member.

14. The light tower kit of claim 10 further comprising an actuator to control the on/of status of the lamp independently of the engine.

15. The light tower kit of claim 10 further comprising a device coupled to the engine for recharging the energy storage device.

16. The light tower kit of claim 10 further comprising a current limiting device in series with the lamp.

17. The light tower kit of claim 10 wherein the current limiting device is a resettable breaker.

18. The light tower kit of claim 10 wherein the current limiting device is a fuse.

19. The light tower kit of claim 10 further comprising a connector at a distal end of an electrical cable coupled to the lamp.

20. The light tower kit of claim 10 further comprising a clip for coupling the lamp to an energy storage device.

21. The light tower kit of claim 10 wherein when the light tower is in the working position, the second member is only coupled to the drawbar.

22. A towable power plant, comprising:

a frame having a drawbar with a hitch;

at least one wheel coupled to the frame;

an engine secured to frame for driving at least one of a compressor, a fluid pump, and an electric generator;

a compressor coupled to the engine for generating compressed air;

an energy storage device for starting the engine;

at least one lamp electrically coupled to the energy storage device;

a first support member mechanically coupled to the lamp; and a second support member coupled to the drawbar, the first support member pivotably coupled to the second member and moveable between a towable position and a working position.

* * * * *

UNITED STATES PATENT AND TRADEMARK OFFICE
CERTIFICATE OF CORRECTION

PATENT NO. : 6,805,462 B1
DATED : October 19, 2004
INVENTOR(S) : Smith et al.

It is certified that error appears in the above-identified patent and that said Letters Patent is hereby corrected as shown below:

Column 4,
Lines 14 and 54, "on/of" should read -- on/off --.

Signed and Sealed this

Eleventh Day of October, 2005

JON W. DUDAS
*Director of the United States Patent and Trademark Office*